United States Patent
Popovich et al.

(10) Patent No.: US 9,578,023 B2
(45) Date of Patent: Feb. 21, 2017

(54) IDENTITY ASSERTION BASED ON BIOMETRIC INFORMATION

(71) Applicant: MOTOROLA SOLUTIONS, INC, Schaumburg, IL (US)

(72) Inventors: George Popovich, Palatine, IL (US); Michael F Korus, Eden Prairie, MN (US); Anthony R Metke, Naperville, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 14/541,599

(22) Filed: Nov. 14, 2014

(65) Prior Publication Data

US 2016/0142404 A1    May 19, 2016

(51) Int. Cl.
*H04L 29/06* (2006.01)
*H04W 12/12* (2009.01)

(52) U.S. Cl.
CPC ....... *H04L 63/0861* (2013.01); *H04L 63/0815* (2013.01); *H04L 63/108* (2013.01); *H04L 63/123* (2013.01); *H04W 12/12* (2013.01)

(58) Field of Classification Search
CPC .... H04L 63/108; H04L 63/107; H04L 63/102; H04L 63/08; H04L 63/105; H04L 63/10; H04L 63/0861; H04L 63/0815; H04L 63/123; G06F 21/34; G06F 21/32; H04W 12/12

See application file for complete search history.

(56) References Cited

U.S. PATENT DOCUMENTS

| | | | |
|---|---|---|---|
| 6,877,095 B1 | 4/2005 | Allen et al. | |
| 7,028,335 B1* | 4/2006 | Borella | H04L 29/12367 370/389 |
| 7,788,711 B1* | 8/2010 | Sun et al. | 726/8 |
| 8,508,338 B1* | 8/2013 | Fiddy | 340/5.82 |
| 8,990,557 B2* | 3/2015 | Kassaei et al. | 713/159 |
| 9,003,196 B2* | 4/2015 | Hoyos et al. | 713/186 |
| 2005/0015601 A1 | 1/2005 | Tabi et al. | |
| 2006/0112279 A1* | 5/2006 | Cohen et al. | 713/186 |
| 2007/0096870 A1* | 5/2007 | Fisher | 340/5.53 |

(Continued)

FOREIGN PATENT DOCUMENTS

AU    199935573 A    1/2000

OTHER PUBLICATIONS

IEEE Publication, Ensuring the Identity of a User in Time; A Multi=Modal Fuzzy Approach, by Ernesto Antonia Assini, Published Jun. 27-29, 2007.

(Continued)

*Primary Examiner* — Don Zhao

(57) ABSTRACT

A method and apparatus for providing a lifetime extension to an identity assertion is provided herein. During operation a user will authenticate to an identity management server (also known as an authorization server or an authentication server) to obtain an identity assertion. An identity assertion will be provided upon successful authentication. The lifetime of the identity assertion will be based on whether or not biometric information of the user will be used by the device to which the assertion is being issued to identify the user prior to allowing the use of the identity assertion.

12 Claims, 6 Drawing Sheets

(56) References Cited

U.S. PATENT DOCUMENTS

| | | |
|---|---|---|
| 2008/0114986 A1* | 5/2008 | Morris .................... G06F 21/46 |
| | | 713/183 |
| 2008/0162943 A1 | 7/2008 | Ali et al. |
| 2014/0047532 A1 | 2/2014 | Swatskey |
| 2014/0189841 A1 | 7/2014 | Metke et al. |
| 2014/0245389 A1* | 8/2014 | Oberheide et al. ............... 726/3 |

OTHER PUBLICATIONS

IEEE Publication, Soft Biometric Traits for Continuous User by Koichiro Niinuma, Unsang Park, Anil K. Jain Published Dec. 1, 2010.
Microsoft Publication, Claims-Bases Identity and Access Control by Dominick Baier, Vittorio Bertocci, Keith Brown, Scott Densmore, Eugenio Pace and Matias Woloski, published 2011.
The International Search Report and the Written Opinion, PCT/US2015/059206, filed Nov. 5, 2015, mailed: Feb. 5, 2016, all pages.

\* cited by examiner

IDENTITY ASSERTION BASED ON BIOMETRIC INFORMATION

FIELD OF THE INVENTION

The present invention generally relates to identity assertions and more specifically to identity assertion time-to-live extension based on biometric information.

BACKGROUND OF THE INVENTION

Single Sign On (SSO) (also known as Enterprise Single Sign On or "ESSO") is the ability for a user to enter the same id and password to logon to multiple applications. Current single sign on identity and access management solutions include industry standard protocols like SAML and OAuth to issue identity assertions (such as tokens, cookies, etc.) to user devices for subsequent access to application servers. These issued identity assertions may have a limited lifetime, or time to live (TTL). Limiting the TTL prevents the assertions from being abused or otherwise compromising the security of the overall system (e.g. a mobile device is lost/stolen during the assertion lifetime).

There is a user experience benefit to having longer assertion lifetimes. Thus there is a compromise today where the user benefits from longer assertion lifetimes, but system security is improved with shorter lifetimes. It would be beneficial for a user to increase assertion lifetimes without increasing the likelihood of the assertion being abused.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above, mentioned need, a method and apparatus for providing a lifetime extension to an identity assertion is provided herein. During operation a user will authenticate to an identity management server (also known as an authorization server or an authentication server) to obtain an identity assertion. An identity assertion will be provided upon successful authentication. The lifetime of the identity assertion will be based on whether or not biometric information of the user will be used by the device to which the assertion is being issued to identify the user prior to allowing the use of the identity assertion.

The above technique improves the SSO experience, especially where higher assurance solutions are used (e.g. multi-factor user authentication is required), and where an identity management server may not always be reachable (public safety use cases such as at an incident scene). This is accomplished by for example, enabling the ID assertions to be as long lived as the SSO lifetime so long as biometric information is being matched prior to using the assertion.

Several embodiments are envisioned as to how to use biometric information to authenticate the user at points in time after the original ID assertion is issued by the identity-management server. "Biometrics checks" could be performed at specific points in time. For example, a biometric comparison may be performed as one authentication factor when the identity assertion is requested and the user is initially authenticated. Additionally, a biometric comparison may be performed each time the user tries to access an application using the assertion. Additionally, biometric comparisons may be performed periodically and continuously (e.g., once a second) in order to extend the lifetime of an identity assertion.

Figure 1:
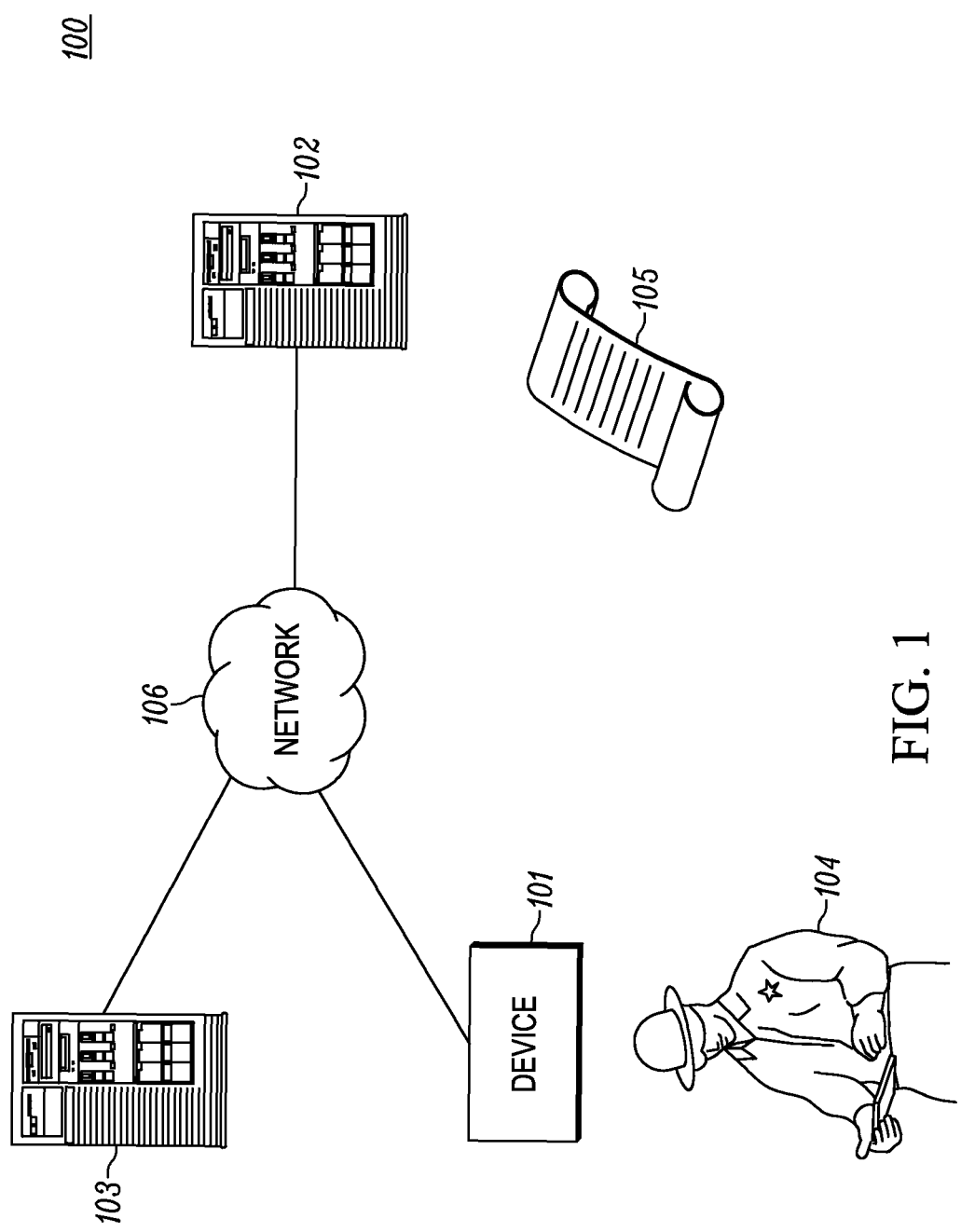
FIG. 1 illustrates a general operating environment where an identity assertion is provided.

FIG. 1 illustrates a typical user environment 100 where identity management is utilized. Environment 100 generally includes a device 101, application system 102, identity management server 103, and network 106. This identity management server 103 enables an entity or individual (a "user") 104 to access computer programs, applications, information and services hosted by the application system 102 via communication device 101.

Device 101 can be any portable electronic device that is associated with a particular user 104, including but not limited to a standalone display or monitor, a handheld computer, a personal computer, a tablet computer, a mobile phone, a police radio, a media player, a personal digital assistant (PDA), a GPS receiver, or the like, including a combination of two or more of these items.

Application system 102 preferably comprises a server that gives access to one of any number of applications. For example, application system 102 may comprise an email server, database server, proprietary server, web server, or the like where access to content or services hosted by system 102 is given only upon receiving a valid identity assertion.

Identity management server 103 is preferably an authentication server equipped with SAML or OAUTH identity-management protocols, configured to issue identity assertions to users based on the users performing user authentication, however, other identity-management protocols may be utilized in alternate embodiments. Such a server is sometimes referred to as an authentication server. Thus, user 104 may log in once to server 103, and have device 101 issued an identity assertion 105. Assertion 105 may be provided by device 101 to application system 102 without being prompted to log in again. Thus, once the user (using device 101) performs user authentication (a.k.a. "primary authentication" in the identity management community) with the server 103, server 103 issues an identity assertion 105 (in the form of a token, cookie, . . . , etc.) to device 101. Device 101 stores the assertion 105 until the user attempts to gain access to application server 102. When requesting access to application server 102, device 101 sends the assertion 105 to application server 102 in lieu of entering a user name and password.

Similarly, user 104 may log in once to server 103, and have device 101 issued a primary (long lived) identity assertion 105 (in the form of a token, cookie, . . . , etc.) that is used for future user authentications with server 103, for the purpose of requesting subsequent assertions. These subsequent assertions may be scoped to a specific application server 102 or more generally to a domain of application servers.

Network 106 may comprise one of any number of over-the-air or wired networks. For example network 106 may comprise a private 802.11 network set up by a building operator, a next-generation cellular communications network operated by a cellular service provider, or any public-safety network such as an APCO 25 network or the FirstNet broadband network.

As discussed above, there is a user experience benefit to having longer assertion lifetimes (longer periods between when the user is prompted for credentials). In order to address this issue, identity management server 103 will issue an assertion having a longer lifetime when biometric data is being checked prior to the assertion being used. The assertion itself may comprise a field indicating that biometric information (and the type of information) is or is not required prior to the assertion being used. Server 103 may issue assertions having a first lifetime (time to live) when no biometric data is being used, and have a second, longer, lifetime when biometric data is being used.

In a first embodiment, at the time the assertion is issued to device 101, device 101 takes a first biometric measurement (e.g., a facial scan, or electro cardiogram sample). At a later point in time, when the assertion is to be used, device 101 takes a second biometric measurement (e.g., a second facial scan or electro cardiogram sample) and compares it with the first biometric measurement. If there is a match, the assertion is allowed to be used. If there is no match, the assertion is preferably locked, deleted, or rendered unusable by device 101.

In a second embodiment, user 104 may configure device 101 with the biometric information. Later when an application server 102 needs to be accessed, device 101 may take a biometric measurement and compare it with the configured biometric measurement. The assertion will be valid only if the measured and configured biometric measurements match. If no match exists, the assertion is locked, deleted, or rendered unusable by device 101.

As discussed above, one embodiment has device 101 performing user authentication by comparing the user's biometric information periodically after the issuance of an identity assertion and disables or deletes the assertion when the user authentication fails a preconfigured number of attempts within a given time. In one embodiment that assertion issued to the device contains information that tells the device how often it needs to perform such a biometric user authentication.

Biometric information comprises physical attributes such as facial features, voice or retinal scans, and can be used to identify an individual's unique identity. Other forms of biometric information include, but are not limited to fingerprints, electro cardiogram data, brainwave scans, and finger/palm vein prints.

Figure 2:
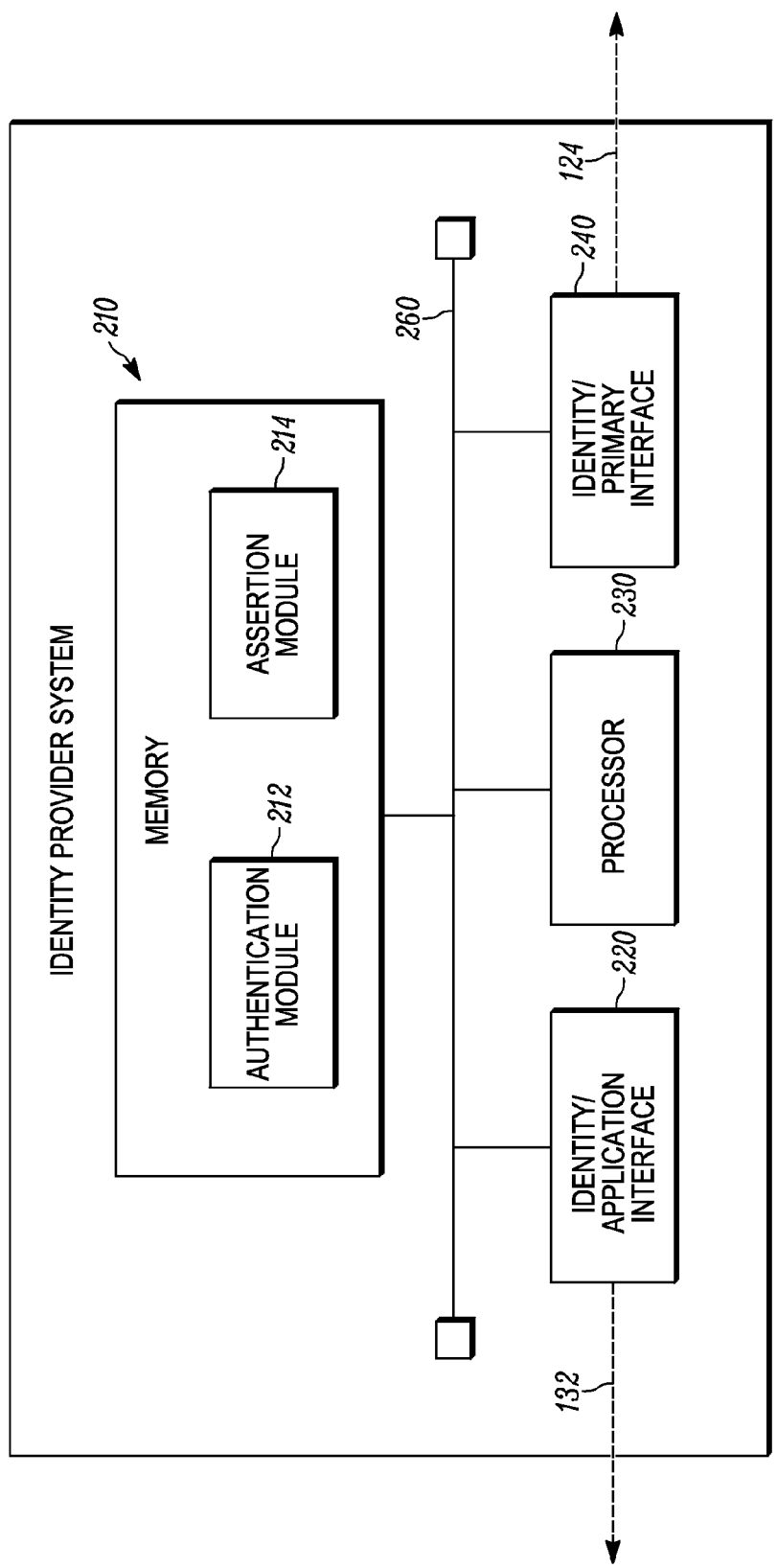
FIG. 2 is a block diagram of an identity management server of FIG. 1.

FIG. 2 is a block diagram of an identity management server of FIG. 1. As shown in FIG. 2, identity management server 103 may include memory 210, identity/application interface 220, processor 230, identity/primary interface 240 and bus 260. Identity management server 103 may be implemented in one or more servers. The identity/application interface 220 enables identity management server 103 to communicate with application server 102 via communication path 132 through network 106. The identity/primary interface 240 enables identity management server 103 to communicate with device 101 via communication path 124, through network 106.

Memory 210 may include an authentication module 212 and an assertion module 214. The authentication module 212 is configured to authenticate the identity of the user 104 via device 101 in response to a request for a user identity assertion from device 101. Assertion module 214 is configured to generate a user identity assertion as a function of the request from device 101. Memory 210 may store user identity assertions and the corresponding users and devices.

Logic circuitry (processor 230) comprises a digital signal processor (DSP), general purpose microprocessor, a programmable logic device, or application specific integrated circuit (ASIC) and is utilized to set a TTL on an identity assertion.

Figure 3:
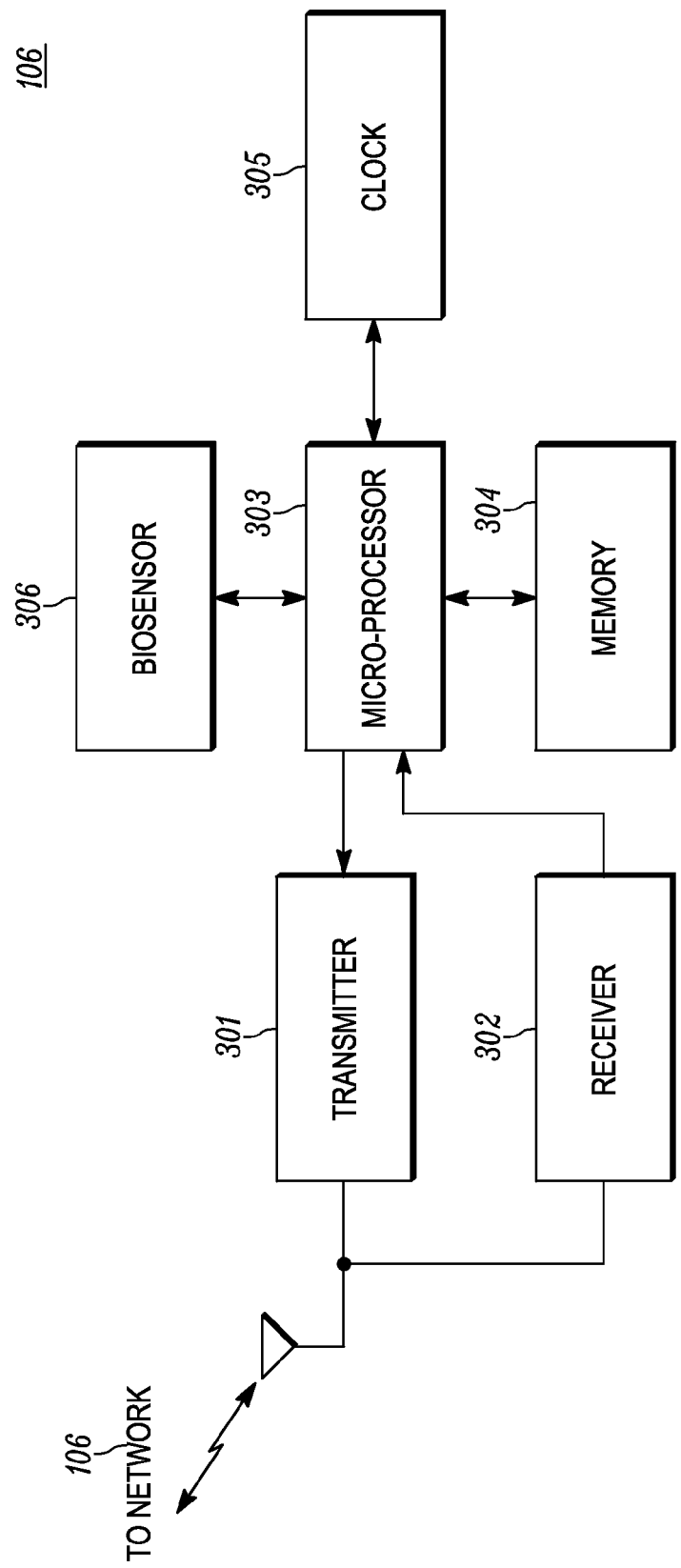
FIG. 3 is a block diagram of the device of FIG. 1.

FIG. 3 is a block diagram of the device of FIG. 1. As shown, device 101 may include transmitter 301, receiver 302, logic circuitry 303, memory 304, clock 305, and biosensor 306. In other implementations, device 101 may include more, fewer, or different components.

Transmitter 301 and receiver 302 may be well known long-range and/or short-range transceivers that utilize a private 802.11 network set up by a building operator, a next-generation cellular communications network operated by a cellular service provider, or any public-safety network such as an APCO 25 network or the FirstNet broadband network, Bluetooth, or NFC (Near Field Communications). Transmitter 301 and receiver 302 may also contain multiple transmitters and receivers, to support multiple communications protocols simultaneously.

Biosensor 306 comprise such things as a heart-rate/rhythm monitor, camera for retina scan, a camera for facial scans, a blood-pressure monitor, a respiratory sensor, a finger print scanner, an electro cardiogram, a microphone for voice recognition, an EEG for brainwave scans, a camera for iris scan, a finger/palm vein reader, a keyboard, etc.

Logic circuitry 303 comprises a digital signal processor (DSP), general purpose microprocessor, a programmable logic device, or application specific integrated circuit (ASIC) and is utilized to lock, delete, or render an identity assertion unusable based on whether or not current biometric information matches previously-stored biometric information.

Memory 304 comprises standard random access memory and is used to store identity assertions and biometric information. Finally clock 305 comprises a standard time measurement device which is used to determine if a TTL of an identity assertion has been exceeded.

Figure 4:
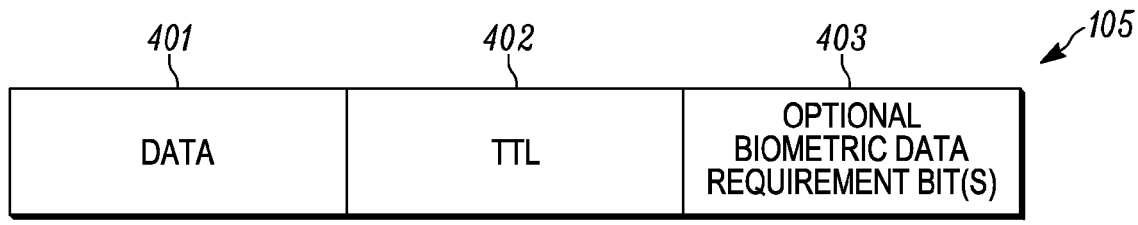
FIG. 4 illustrates an identity assertion.

FIG. 4 illustrates an identity assertion. Identity assertion 105 comprises data 401, a time to live (TTL) 402 also known as an expiration time, and optional biometric data requirement bit 403. Data 401 comprises such things as a user identity, a public key, a token scope (which defines how the token can be used, or what resources it can be used to access). TTL 402 comprises a time (or duration) after which the assertion may expire, for assertion 105. TTL 402 may also comprise a second time in addition to the first time. In this case, the first TTL will indicate a TTL when no biometric information is being matched, while the second TTL will indicate a TTL when biometric information is being matched.

Regardless of whether one or two TTLs are being used, TTL 402 may be based on whether or not biometric information on a user is going to be used prior to assertion 105 being forwarded. For example, assertion 105 may have a 5 minute time to live if no biometric information is required from the user, and have a 15 minute time to live when biometric information is required from the user.

Optional bit(s) 403 may be used to indicate whether or not biometric information must be acquired from the user prior to the assertion being used. These bits may also be used to identify the type of biometric information needed. For example, identity management server 103 may issue identity assertions that always require the use of certain biometric information (e.g., facial scan). In this case, the use of bit 403 would be unnecessary. However, in some situations server 103 may issue identity assertions having a TTL that is based on whether or not biometric information will be used along with the assertion. In this situation, a first TTL may be used when no biometric information is required, and a second, longer TTL may be used when biometric information is required (as indicated by bit 403).

In one embodiment, a device, when requesting an identity assertion would authenticate itself to server 103 using a certificate that indicates that the device is configured to require biometric authentication of the user prior to unlocking a received identity assertion. In this embodiment, server 103 would issue assertions of a default (or short) lifetime to clients which were not able to provide such a certificate, and would issue assertions with extended durations to clients which were able to perform authentication with such a certificate.

Figure 5:
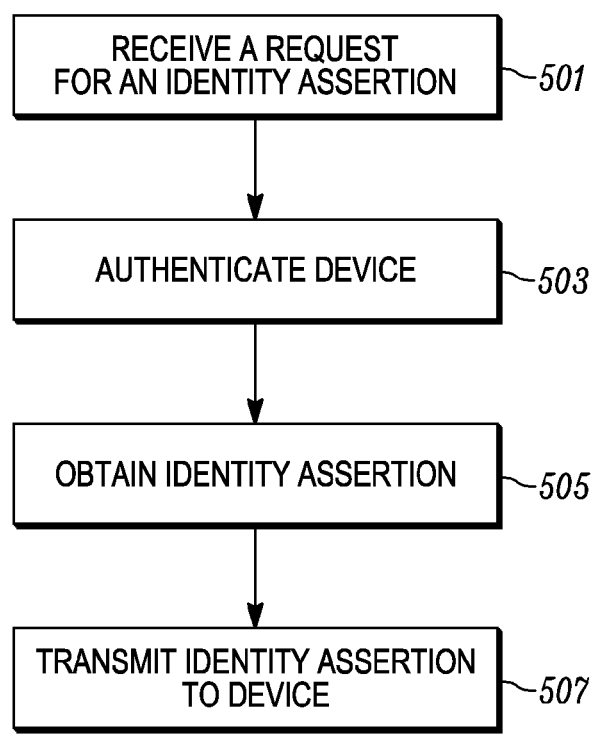
FIG. 5 is a flow chart showing operation of the identity management server of FIG. 1.

FIG. 5 is a flow chart showing operation of the identity management server of FIG. 1. The logic flow begins at step 501 where interface 240 receives a request for an identity assertion from device 101. The request may include information needed to determine that device 101 is capable of acquiring biometric information prior to using an identity assertion. At step 503 processor 230 accesses authentication module 212 to authenticate device 101. Once authenticated, processor 230 accesses assertion module 214 to obtain an identity assertion (step 505). As discussed above, the TTL for the identity assertion will be based on whether or not biometric information will be acquired prior to using the identity assertion. Finally, at step 507 processor 230 utilizes interface 240 to provide the assertion to device 101.

Figure 6:
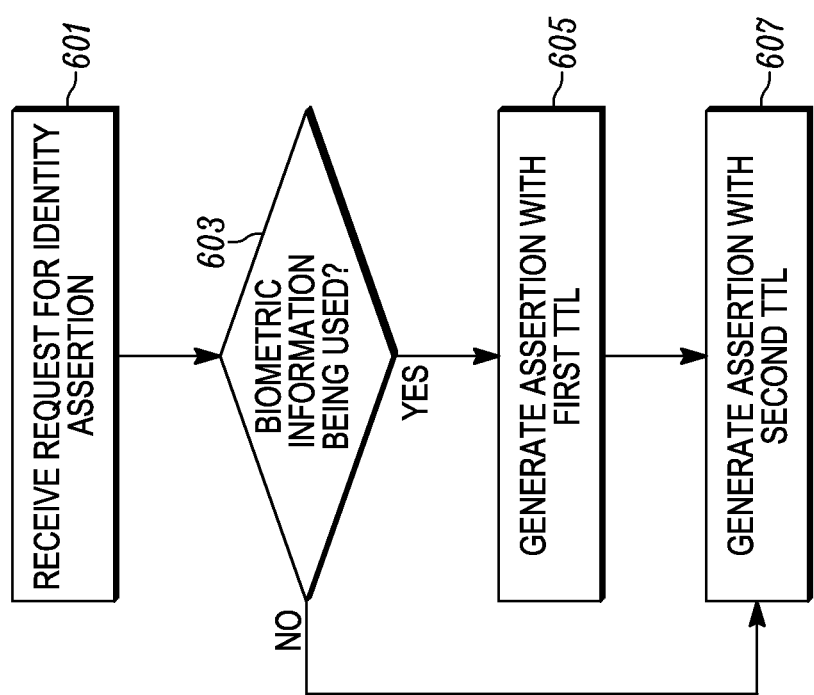
FIG. 6 is a flow chart showing the operation of assertion module

FIG. 6 is a flow chart showing the operation of assertion module 214. The logic flow begins at step 601 where assertion module 214 receives a request for an identity assertion. As discussed above, as part of the request, information is received indicating whether or not device 101 will be performing biometric matching prior to using the identity assertion. At step 603 assertion module 214 determines whether biometric information will be matched by device 101 prior to using the assertion. If so, an assertion is generated having a first TTL (step 605), if not, an assertion is generated having a second TTL (step 607). Preferably the first TTL is greater than the second TTL. As discussed above, in one embodiment of the present invention both the first and the second TTL are included within the assertion.

As discussed above, biometric information may be taken from the group consisting of a heart rate/rhythm, a retina scan, a facial scan, a blood pressure, a respiration rate, a finger print, a heart rate/rhythm, a voice print, a brainwave, an iris scan, a finger/palm vein print.

Additionally, the first TTL is greater than the second TTL, and after expiration of the first or the second TTL, the identity assertion is locked, deleted, or rendered unusable. Additionally, the identity assertion may be generated having an indication that biometric information must be matched prior to using the identity assertion. The identity assertion may be provided to a device in the form of a token or a cookie.

Figure 7:
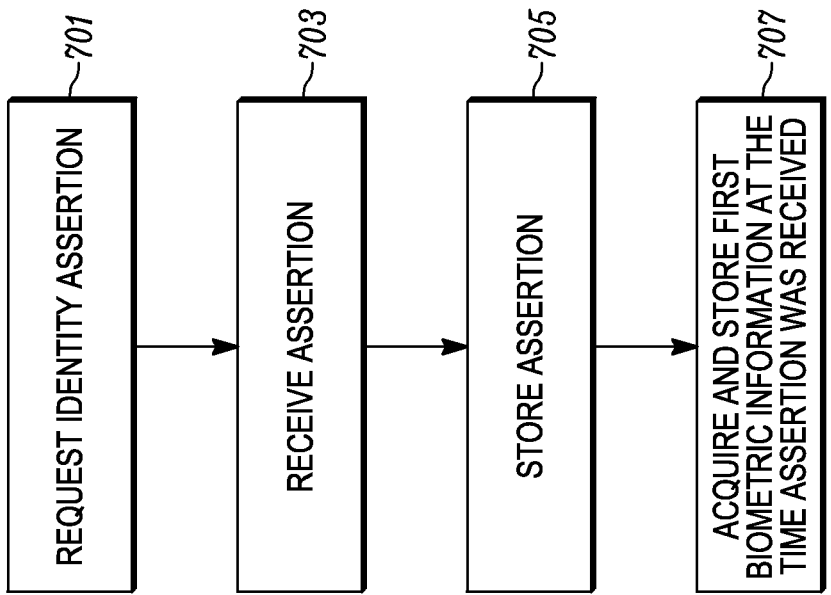
FIG. 7 is a flow chart showing operation of the device of FIG. 1.

FIG. 7 is a flow chart showing operation of the device of FIG. 1 in accordance with a first embodiment of the present invention. The first embodiment of the present invention requires the acquisition of biometric information when any assertion is received. The logic flow begins at step 701 where transmitter 301 transmits a request for an identity assertion to system 103. As discussed above, part of the request may comprise information as to whether or not biometric information will be matched prior to using the assertion. At step 703 an assertion is received having a TTL. The TTL may be of a first time period based on the fact that biometric information is being matched prior to the assertion being used. The assertion is stored in memory 304 (step 705) with an appropriate time of storage (as determined from clock 305). When the assertion is received, step 707 is executed. At step 707 logic circuitry 303 will utilize biosensor 306 to acquire and store first biometric information at the time the assertion was received.

Figure 8:
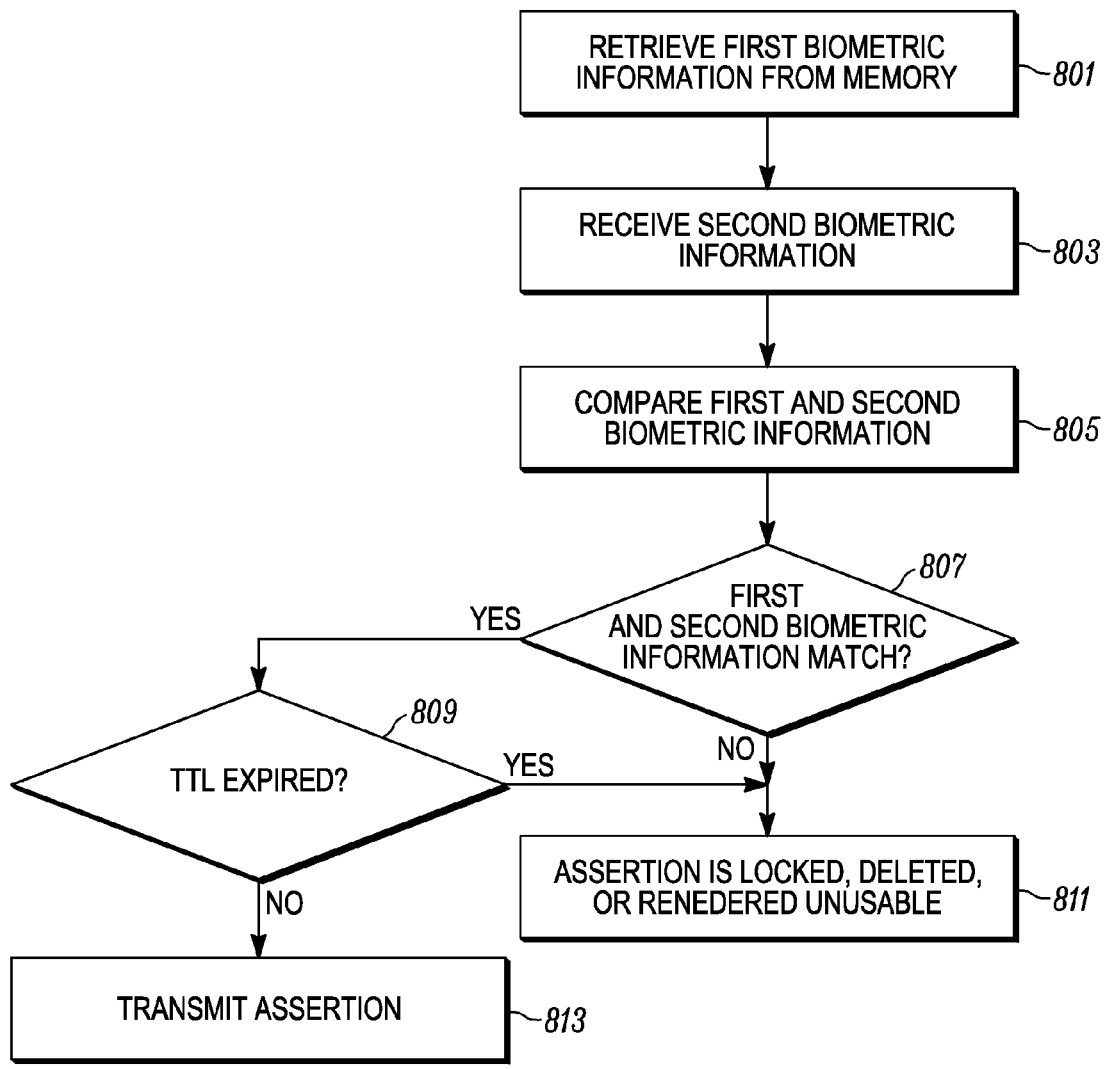
FIG. 8 is a flow chart showing operation of device 106 when using an identity assertion.

FIG. 8 is a flow chart showing operation of device 101 when using an identity assertion. The logic flow begins at step 801 where first biometric information is retrieved by logic circuitry 303 from memory 304. As discussed above, the first biometric information may have been acquired at the time the assertion was received, or alternatively may have been acquired at any point in time prior to the assertion being used. For example, device 101 may be "configured" with the first biometric information at some point in time. At step 803 second biometric information is obtained by processor 303 using biosensor 306. The logic flow continues to step 805 where the first and second biometric information are compared by logic circuitry 303. At step 807 logic circuitry determines if the first and the second biometric information matches. If so, the logic flow continues to step 809. If not, the logic flow continues to step 811 where the assertion is locked, deleted, or rendered unusable by logic circuitry 303.

Returning to step 809, logic circuitry accesses clock 305 and memory 304 to determine if the TTL has expired on the assertion. If so, the logic flow continues to step 811, otherwise the assertion is transmitted via transmitter 301 to application server 102 (step 813).

As discussed above, the assertion may optionally contain two or more time values. In one embodiment, one time may represent the total lifetime (TTL) of the SSO session, and a second time may specify the maximum time allowed between biometric samples of the user 104 behind device 101. If device 101 cannot comply with the maximum time between biometric samples, the device may be required to discard or de-activate the assertion.

In another embodiment, one time may represent the total lifetime of the SSO session if no biometric samples are captured subsequent to the assertion issuance, and the $2^{nd}$ time may represent the total lifetime of the SSO session if biometric samples are captured and the user is successfully authenticated. In this embodiment, application server 102 may require device 101 to authenticate user 104 if the $1^{st}$ time is expired but the $2^{nd}$ time has not. In either embodiment, application server 102 may at any time request device 101 to authenticate the user associated with the identity assertion by capturing a biometric sample and comparing it with a previously-stored biometric sample.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for extending a life of a token/cookie, the method comprising steps of:
   receiving at an identity management server, a request for the token/cookie;
   determining by the identity management server if biometric information is matched with previously-stored biometric measurement at a time when the token/cookie is used;
   generating by the identity management server the token/cookie having a first time to live (TTL) for use when the biometric information is matched; and
   generating by the identity management server the token/cookie having a second TTL for use when the biometric information is not matched, wherein both the first TTL and the second TTL identify differing lifetimes of the token/cookie, beyond which the token/cookie becomes invalid.

2. The method of claim 1 wherein the biometric information is taken from group consisting of a heart rhythm, a retina scan, a facial scan, a blood pressure, a respiration rate, a finger print, a voice print, a brainwave, an iris scan, a finger/palm vein print.

3. The method of claim 1 wherein the first TTL is greater than the second TTL.

4. The method of claim 1 wherein after expiration of the first TTL or the second TTL, the token/cookie is locked, deleted, or rendered unusable.

5. The method of claim 1 further comprising a step of:
generating the token/cookie having an indication that the biometric information must be matched with the previously-stored biometric measurement prior to using the token/cookie.

6. The method of claim 1 further comprising a step of: providing the token/cookie to a device.

7. The method of claim 1 wherein the token/cookie comprises an identity assertion.

8. A method for extending a life of a token/cookie, the method comprising steps of:
receiving at an identity management server, a request for the token/cookie;
generating by the identity management server the token/cookie having a first time to live (TTL) for use when biometric information is matched with previously-stored biometric measurement at a time of using the token/cookie; and
generating by the identity management server the token/cookie having a second TTL when the biometric information is not matched with the previously-stored biometric measurement at the time of using the token/cookie, wherein both the first TTL and the second TTL identify differing lifetimes of the token/cookie, beyond which the token/cookie becomes invalid.

9. The method of claim 8 wherein the biometric information is taken from group consisting of a heart rhythm, a retina scan, a facial scan, a blood pressure, a respiration rate, a finger print, a, a voice print, a brainwave, an iris scan, a finger/palm vein print.

10. The method of claim 8 wherein the first TTL is greater than the second TTL.

11. The method of claim 8 wherein after expiration of the first TTL or the second TTL, the token/cookie is locked, deleted, or rendered unusable.

12. The method of claim 8 wherein the token/cookie comprises an identity assertion.

\* \* \* \* \*